United States Patent
Welch et al.

(10) Patent No.: US 8,072,547 B2
(45) Date of Patent: Dec. 6, 2011

(54) COMB FILTER THAT UTILIZES HOST MEMORY

(75) Inventors: John E. Welch, Encinitas, CA (US); Michael A. Eskin, El Cajon, CA (US); Lauren E. Linstad, Jamul, CA (US); Torry Steed, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1538 days.

(21) Appl. No.: 11/395,023

(22) Filed: Mar. 31, 2006

(65) Prior Publication Data

US 2007/0229711 A1 Oct. 4, 2007

(51) Int. Cl.
*H04N 9/78* (2006.01)

(52) U.S. Cl. .......................... 348/665; 348/667

(58) Field of Classification Search .......... 348/663–670, 348/714; *H04N 9/78, 9/77*
See application file for complete search history.

(56) References Cited

U.S. PATENT DOCUMENTS

| | | | |
|---|---|---|---|
| 5,790,110 A | 8/1998 | Baker et al. | |
| 6,538,656 B1 | 3/2003 | Cheung et al. | |
| 6,760,793 B2* | 7/2004 | Kelley et al. | 710/52 |
| 7,339,630 B2* | 3/2008 | Johnson | 348/668 |
| 7,391,478 B2* | 6/2008 | Johnson | 348/667 |
| 7,391,479 B2* | 6/2008 | Johnson | 348/667 |
| 2005/0174492 A1* | 8/2005 | Delanghe et al. | 348/663 |

FOREIGN PATENT DOCUMENTS

| | | |
|---|---|---|
| JP | 2003-189262 | 7/2003 |
| WO | WO 99/00741 A1 | 1/1997 |
| WO | WO 98/47292 | 10/1998 |

OTHER PUBLICATIONS

Sethi et al., "Designing PCI Express™ Architecture Isochronous Devices and Drivers," presented at Microsoft Windows Hardware Engineering Conference (WINHEC) May 2003, New Orleans, Louisiana.
Search Report and Written Opinion from PCT/US2006/012368, dated Jan. 19, 2007 (11 pgs).
Office Action issued by the State Intellectual Property of the Peoples' Republic of China (SIPO) on Mar. 8, 2010 for corresponding Chinese Patent Application No. 200680054078.6 (6 pgs.) with translation (12 pgs.).
European Patent Office, Response to Official Action, Serial No. 06749183.7, Nov. 11, 2009.
European Patent Office, Official Action, Serial No. 06749183.7, Jul. 6, 2010.
Decision of Rejection issued by the State Intellectual Property Office (SIPO) dated Oct. 8, 2010 (with English translation) 17 pages.

* cited by examiner

*Primary Examiner* — Sherrie Hsia

(74) *Attorney, Agent, or Firm* — Jackson Walker L.L.P.; Christopher J. Rourk

(57) ABSTRACT

A comb filter system that utilizes host memory is disclosed. The comb filter system that utilizes host memory may include a comb filter. The comb filter system that utilizes host memory may include an allocated host memory. The comb filter system that utilizes host memory may include an interface in signal communication with the comb filter and allocated host memory.

25 Claims, 4 Drawing Sheets

COMB FILTER THAT UTILIZES HOST MEMORY

BACKGROUND OF THE INVENTION

1. Field of Invention

This invention relates to video decoders, and in particular to video decoder having a comb filter system that utilizes host memory.

2. Related Art

The complexity and flexibility of electronic processing devices such as personal computers ("PCs"), personal digital assistants ("PDAs"), two-way set top boxes (both for cable and satellite), personal video recorders ("PVRs"), cellular telephones, two-way pagers, and other host devices capable of processing information are growing a rapid pace. As such, these types of devices have become common place in today's society.

With the growth, improvement, and general acceptance of the Internet, more information is becoming accessible to these types of devices in varying forms of content leading to a fusion between these types of devices and various types of multimedia content. As an example, the growth of both cable and satellite type television systems has resulted in cable ready televisions, two-way set top boxes (the devices that interface between the cable or satellite systems and the television monitor generally known as "STBs"), digital cable, cable modems to access the Internet, Internet based web-TV, digital telephone over cable, on-demand video services, etc. Additionally, devices such as cable ready televisions, web-TVs, Internet capable video games, and PCs are increasing being connected to either cable or satellite type broadband systems to enable broadband connectivity with the Internet.

As an example, as PCs become more multimedia type devices, video and audio content are becoming important for PC users. Radio and television tuner add-on devices from numerous vendors are common place. Generally, these radio and/or television tuner add-on devices are peripheral devices that include an audio, video, or both, decoder (i.e., an audio/video decoder—also know generically as a "A/V decoder" and/or "video decoder") that is capable of receiving a broadcast composite video signal (i.e., having luminance and chrominance spectra components, also known as channels) that is transmitted in one of the world's three television transmission formats (i.e., either NTSC, PAL, or SEACAM) and converts it to a digital data stream component video signal (i.e., having red, green, and blue "RGB" or "Y $P_b P_r$") that has a format that is readable to the particular type of PC. Luminance ("Y") describes a black and white image in full detail and chrominance ("C" also referred to as "UV") describes coloration of the image. These types of video decoders may vary in the way they separate luminance and chrominance spectra in the composite video signal and generally include either a notch filter or comb filter.

In the case of video decoders utilizing a comb filter, the comb filter separates the composite video signal into both Y and C channels to reduce both cross-luma (i.e., cross-luminance) and cross-chroma (i.e., cross-chrominance) artifacts. The comb filter is utilized so that the resulting video images show fine picture detail from standard broadcasts, Laserdisk, and other composite sources. Video decoders utilizing a comb filters also reduce discolorations in fine picture detail and provide purer color overall.

In general, known video decoders utilize three-line ("3-line") adaptive comb filters (also known as three-line two-dimensional "3-line 2D" comb filters) or higher quality three-dimensional ("3D") comb filters (also know as "3D Y/C filter," "3D digital comb filter," or "motion adaptive" comb filters). As far as 3D comb filters, in addition to separating the Y and C channels of a composite video signal, a 3D comb filter also performs two additional functions. While comparing three consecutive horizontal scan lines within a single video frame, the 3D comb filter also analyzes each frame for improved image quality.

Unfortunately, known approaches to 3D comb filtering of composite video typically requires local memory frame buffers (on the video decoder) to hold the previous frames of video for use in the 3D comb filter. As a result, currently known peripheral devices utilizing 3D comb filters (such as, for example, PC TV 3D comb filter cards) have an additional standalone integrated circuit ("IC") along with a dedicated dynamic read access memory ("DRAM") to provide frame buffer storage of previous video fields required for the 3D comb filter. This additional hardware adds significant cost and complexity to the peripheral device and as peripheral devices move towards dual-tuner use, board space for all of the required additional components on the peripheral device also becomes an issue.

Therefore, there is a need for a new comb filter system on a peripheral device that does not require the utilization of dedicated DRAM on the peripheral device.

SUMMARY

A comb filter system that utilizes host memory ("CFSHM") is disclosed. The CFSHM may include a comb filter, an allocated host memory, and an interface in signal communication with the comb filter and allocated host memory. The comb filter is located on a peripheral device and the allocated host memory is located within the host memory, wherein the host memory is located on a host device. Additionally, the interface is configured to allow the comb filter utilization of the allocated host memory.

In an example of operation, the CFSHM may allocate a portion of the host memory for allocated host memory and then utilize the allocated host memory with the comb filter.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred and various alternative embodiments, reference is made to the accompanying drawings that form a part hereof, and in which is shown by way of illustration a specific embodiment in which the invention may be practiced. It is to be understood that other embodiments may be utilized and structural changes may be made without departing from the spirit and scope of this invention.

The invention is described with reference to various functional block diagrams, which illustrate possible applications of and embodiments of the invention from a functional perspective. These functional block diagrams should not be interpreted to imply or otherwise require a particular physical architecture in accordance with the partitioning of the functionality depicted therein. Instead, it will be appreciated by one of ordinary skill in the art that various alternative physical architectures (whether hardware, software or a combination thereof) can be used to implement the described functionality. For example, the invention can be implemented using various hardware and software components, including, for example, using a semiconductor integrated circuit (e.g., a chip) or a combination of semiconductor integrated circuits (e.g., a chipset or multi-chip module), or in associated circuitry, or in the software, firmware, protocol stacks, libraries, algorithms or other processes operating thereon (or in any configuration of one or more of the foregoing). The chip or chipset implementation may include an integrated circuit, including, for example, any of the following alone or in combination: an application specific integrated circuit ("ASIC"), a digital signal processor ("DSP"), or another general-purpose or specific-purpose processor, and associated circuitry (e.g., memory, co-processors, busses, etc.).

In general, a comb filter system that utilizes host memory ("CFSHM") is disclosed. The CFSHM may include a comb filter, an allocated host memory, and an interface in signal communication with the comb filter and allocated host memory. The comb filter is located on a peripheral device and the allocated host memory is located within the host memory, wherein the host memory is located on a host device. Additionally, the interface is configured to allow the comb filter utilization of the allocated host memory.

Figure 1:
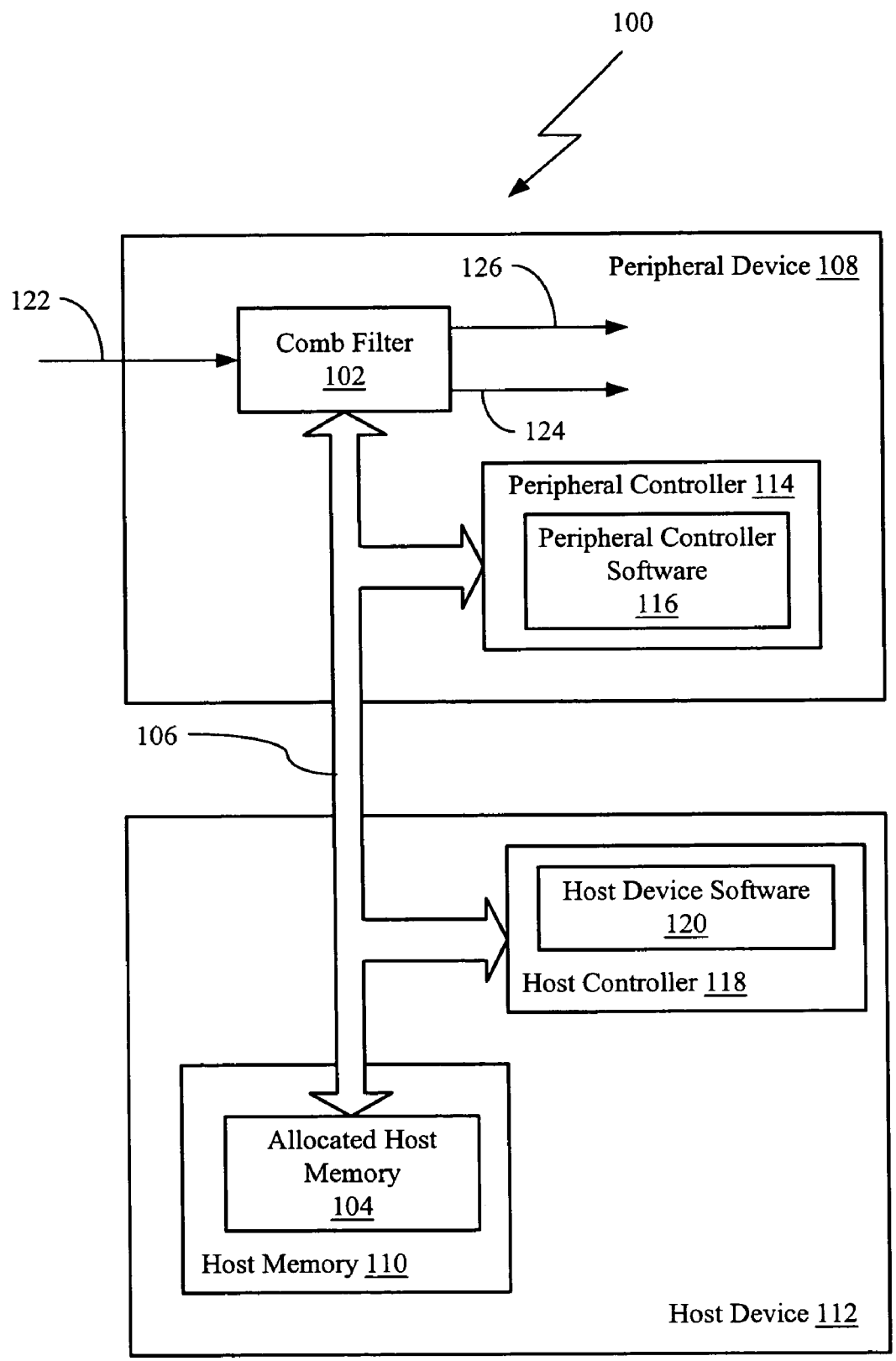
FIG. 1 is a functional block diagram of an example of an implementation of a comb filter system that utilizes host memory ("CFSHM").

Turning to FIG. 1, a functional block diagram of an example of an implementation of a comb filter system that utilizes host memory ("CFSHM") 100 is shown. The CFSHM 100 may include a comb filter 102, an allocated host memory 104, and an interface 106 in signal communication with the comb filter 102 and allocated host memory 104. The comb filter 102 is located on a peripheral device 108 and the allocated host memory 104 is located within the host memory 110, wherein the host memory 110 is located on a host device 112. The CFSHM 100 may also include a peripheral controller 114 located within the peripheral device 108 that is in signal communication with the interface 106. The peripheral controller 114 may include peripheral controller software 116. The host device 112 may also include a host controller 118, in signal communication with the interface 106, which includes host device software 120.

As an example, the comb filter 102 is a device that receives a composite video input signal 122 and separates the Luminance ("Y") channel 124 (which describes a black and white image in full detail) and chrominance ("C") channel 126 (which describes coloration of the image). It is appreciated by those skilled in the art that comb filters are well known in the art.

The comb filter 102 may be a three-line ("3-line") adaptive comb filter (also known as three-line two-dimensional "3-line 2D" comb filter) or a higher quality three-dimensional ("3D") comb filter (also know as "3D Y/C filter," "3D digital comb filter," or "motion adaptive" comb filters). If the comb filter 102 is a 3D comb filter, in addition to separating the Y and C channels of a composite video input signal 122, the 3D comb filter may also performs two additional functions. While comparing three consecutive horizontal scan lines within a single video frame, the 3D comb filter may also analyze each frame for improved image quality. Additionally, based on design criteria, a 3D comb filter system may be a hybrid device that includes notch filters, 2D comb filters, and 3D comb filters.

Figure 2:
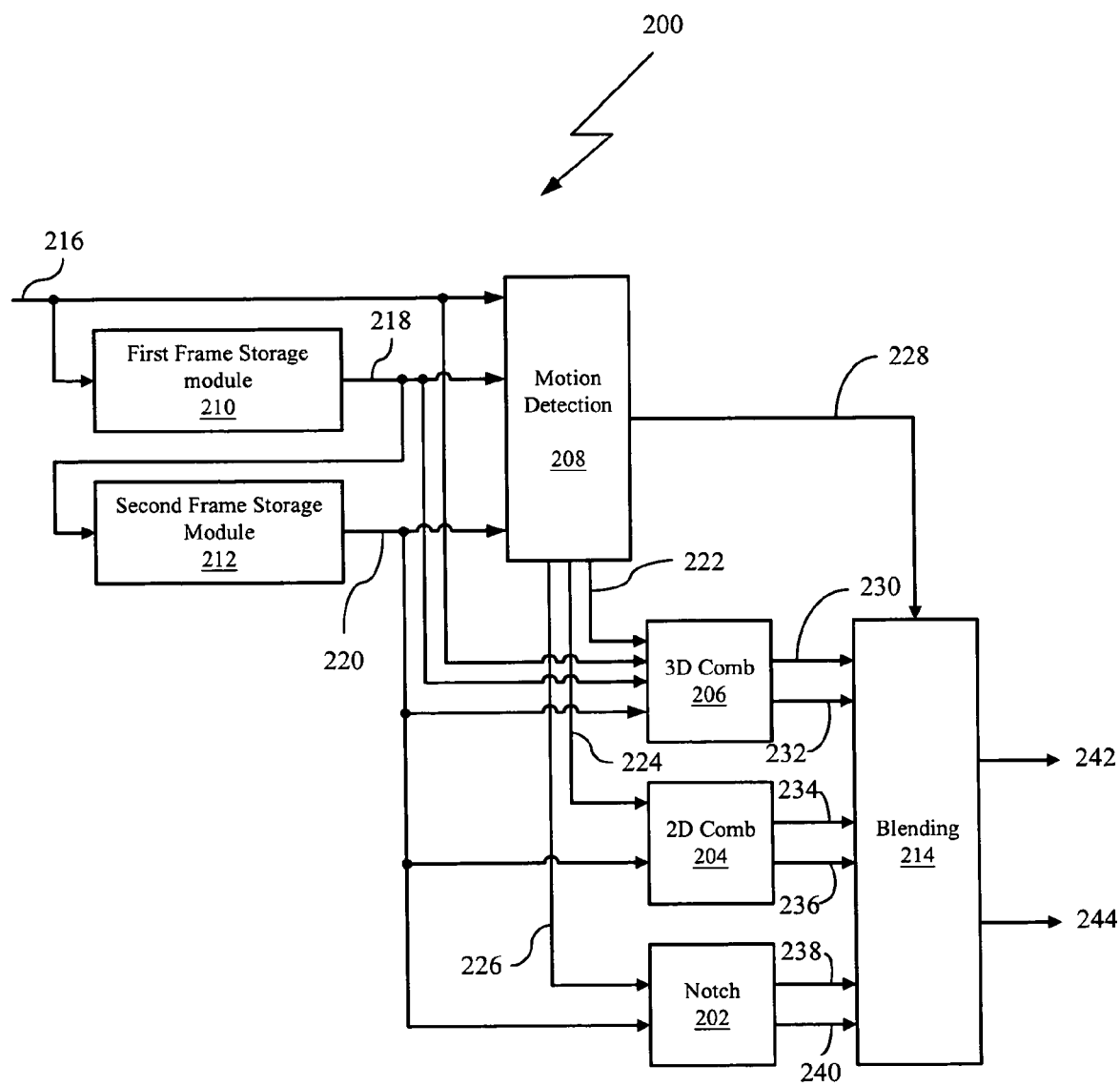
FIG. 2 is a functional block diagram of an example of an implementation of a 3D comb filter system.

In FIG. 2, a functional block diagram of an example of an implementation of a 3D comb filter system 200 is shown. The 3D comb filter system 200 may include a notch filter 202, 2D comb filter 204, 3D comb filter 206, motion detection module 208, first frame storage module 210, second frame storage module 212, and blending module 214. In general, the first frame storage module 210 and second frame storage module 212 are modules, circuitry, or devices that provide memory to store complete frames of data from an composite video input signal 216. The motion detection module 208 is a module, circuitry, or device that detects inter-frame motion from the composite video input signal 216. The blending module 214 is a module, circuitry, or device that includes blend logic configured to average the results of each filter (i.e., notch filter 202, 2D comb filter 204, or 3D comb filter 206) with each other, according to the control provided by the motion detection module 208.

In operation, the composite video input signal 216 is received by the 3D comb filter system 200. The composite video input signal 216 is passed to both the first frame module 210 and the motion detection module 208. The output signal 218 of the first frame module 210 is a one frame delayed version of the composite video input signal 216. The output 218 of the first frame storage module 210 is then passed to the motion detection module 208, second frame storage module 212, the notch filter 202, 2D comb filter 204, and 3D comb filter 206. The output signal 220 of the second frame module 212 is a one frame delayed version of the output signal 218 of the first frame module 210, or in other words, an output signal 220 is two frame delayed version of the composite video input signal 216. The output 220 of the second frame storage module 212 is then passed to the motion detection module 208 and 3D comb filter 206. The motion detection module 208 then detects inter-frame motion from the composite video signal 216 and in response produces a number of control signals 222, 224, 226, 228 that are passed to the filters (i.e., notch filter 202, 2D comb filter 204, or 3D comb filter 206) and blending module 214. As an example, the first control signal 222 of the motion detection module 208 is passed to the 3D comb filter 206, the second control signal 224 of the motion detection module 208 is passed to the 2D comb filter 204, and the third control signal 226 of the motion detection module 208 is passed to the notch filter 202. The control signals 222, 224, and 226 are control signal that configure each respective filter, where each filter may be configured differently depending on the image content and the detection of motion within the image being transmitted by the composite video input signal 216. The motion detection module 208 also outputs a blending control signal 228 that is passed to the blending module 214. The blending control signal 228 controls how the outputs of each filter are blended together, if at all, to create a final output.

The blending module 214 then receives the blending control signal 228 from the motion detection module 208, the separated luma channel 230 and chroma channel 232 from the 3D comb filter 206, the separated luma channel 234 and chroma channel 236 from the 2D comb filter 204, and the separated luma channel 238 and chroma channel 240 from the notch filter 202. The blending module 214 then combines all the inputs utilizing the blending logic of the blending module 214 to produce a combined luma channel ("Y") 242 and combined chroma channel ("C") 244 based on the blending control signal 228.

Returning to FIG. 1, allocated host memory 104 may be any portion of memory from the host memory 110 that is allocated to comb filter 102. As an example, the host memory 110 may be DRAM system memory on personal computer ("PC"). In the case of the host device 112 being a PC, host memory 110 may be system DRAM memory and the host controller 118 may be a central processing unit ("CPU") that runs operating system software for the host device software 120. Examples of the host controller 118 include Intel® type processors, AMD® type processors, IBM® type processors, Motorola® power PC type processors, RISC processors, or any similar type microprocessor. Example of the host device software 120 may include Microsoft® Windows based operating systems ("OSs"), the as of yet not release Longhorn OS from Microsoft®, Apple® based operating systems, Linux based operating systems, IBM® OS-2 based OS, or other similar type OS.

The peripheral controller 114 may be a microcontroller, processor, microprocessor, ASIC, or DSP capable of controlling the operation of the peripheral device 108. The peripheral controller software 116 may be any software capable of running on the peripheral controller 114 and controlling the peripheral device 108.

The interface 106 is a high bandwidth interface bus capable of allowing the comb filter 102 to utilize the allocated host memory 104 without delays. The interface 106 may be a Peripheral Component Interface ("PCI") type of interface that is compliant with PCI Express® interface architecture.

In an example of operation, the CFSHM 100 may allocate a portion of the host memory 110 for the allocated host memory 104 and then utilize the allocated host memory 104 with the comb filter 102. Generally, the peripheral controller software 116 establishes communication with the host device software 120 on the host controller 118 and requests direct access to a portion of host memory 110. The host device software 120 responds but allocating a portion of the host memory 110 into the allocated host memory 104 that the peripheral controller software 116 may access utilizing varying communication protocols such as, for example, utilizing Direct Memory Access ("DMA") to access the allocated host memory 104.

The allocated host memory 104 is dedicated to the comb filter in a way that provides dedicated, guaranteed bandwidth, minimal latency, non-local frame buffer memory for the comb filter 102. In general, the allocated host memory 104 is allocated by the host device software 120 as non-snooped uncached memory in response to requests from a video capture driver (not shown) in the peripheral controller software 116 at driver initialization time. Once allocated, the allocated host memory 104 is allocated for exclusive use by the peripheral device 108. Typically, the scatter gather virtual-to-physical address mapping information for the allocated host memory 104 is provided to the peripheral device 108 by the device driver in the peripheral controller software 116, and after the comb filter 102 is enabled, neither the device driver nor the host controller 118 accesses the allocated host memory 104. As a result, the comb filter 102 utilizes the allocated host memory 104 as a "true non-local storage", and accesses the allocated host memory 104 as needed. In the case of the interface 106 having a PCI Express® interface architecture, the comb filter 102 utilizes an isochronous PCI Express® virtual channel enabled by the root complex, either through BIOS of the host device 112 or by other means allowed by the host controller 118 and host device software 120.

Figure 3:
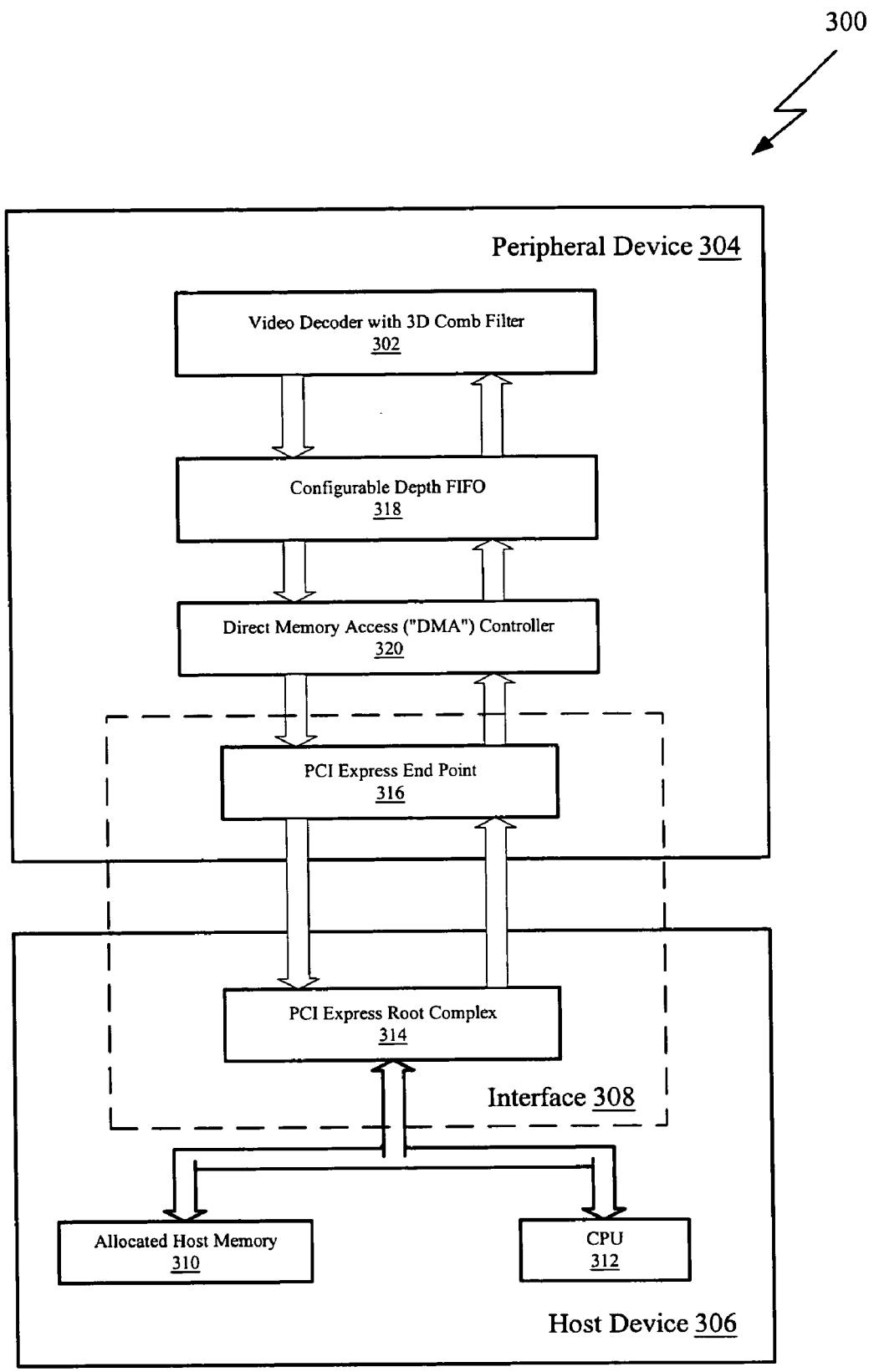
FIG. 3 is a functional block diagram of an example of another implementation of CFSHM.

In FIG. 3, a functional block diagram of an example of another implementation of CFSHM 300 is shown utilizing a video decoder 302 with a 3D comb filer in the peripheral device 304, PC as a host device 306, and a PCI Express® interface architecture for the interface 308. The host device 306 may include allocated host memory 310 and a CPU 312. Similar to FIG. 1, the allocated host memory 310 may be a portion of host memory (not shown) and may be, for example, DRAM system memory. The CPU 312 is the host controller and may run an OS such as, for example, Microsoft® Windows based OS or Apple® based OS. Both the allocated host memory 310 and CPU 312 are in signal communication with the interface 308. In this example, the interface 308 utilizes PCI Express® interface architecture such that it is appreciated by those skilled in the art that the interface includes a PCI Express® root complex module 314 and PCI Express® end point module 316.

The peripheral device 304 may be a multimedia system on a chip such as television and/or video capture card. The peripheral device 304 may include the video decoder 302 with a 3D comb filter, a configurable depth FIFO module 318, and a DMA controller 320.

In an example of operation, once the CFSHM 300 has allocated a portion of the host memory (not shown) for the allocated host memory 310, the 3D comb filter of the video decoder 302 utilizes the allocated host memory 310 in a dedicated manner via the DMA controller 320. The configurable depth FIFO module 318 is a module that assures that any data to and from the video decoder 302 to the allocated host memory 310 is synchronized in that that the data that is first to go in to the configurable depth FIFO module 318 is the first to go out.

Figure 4:
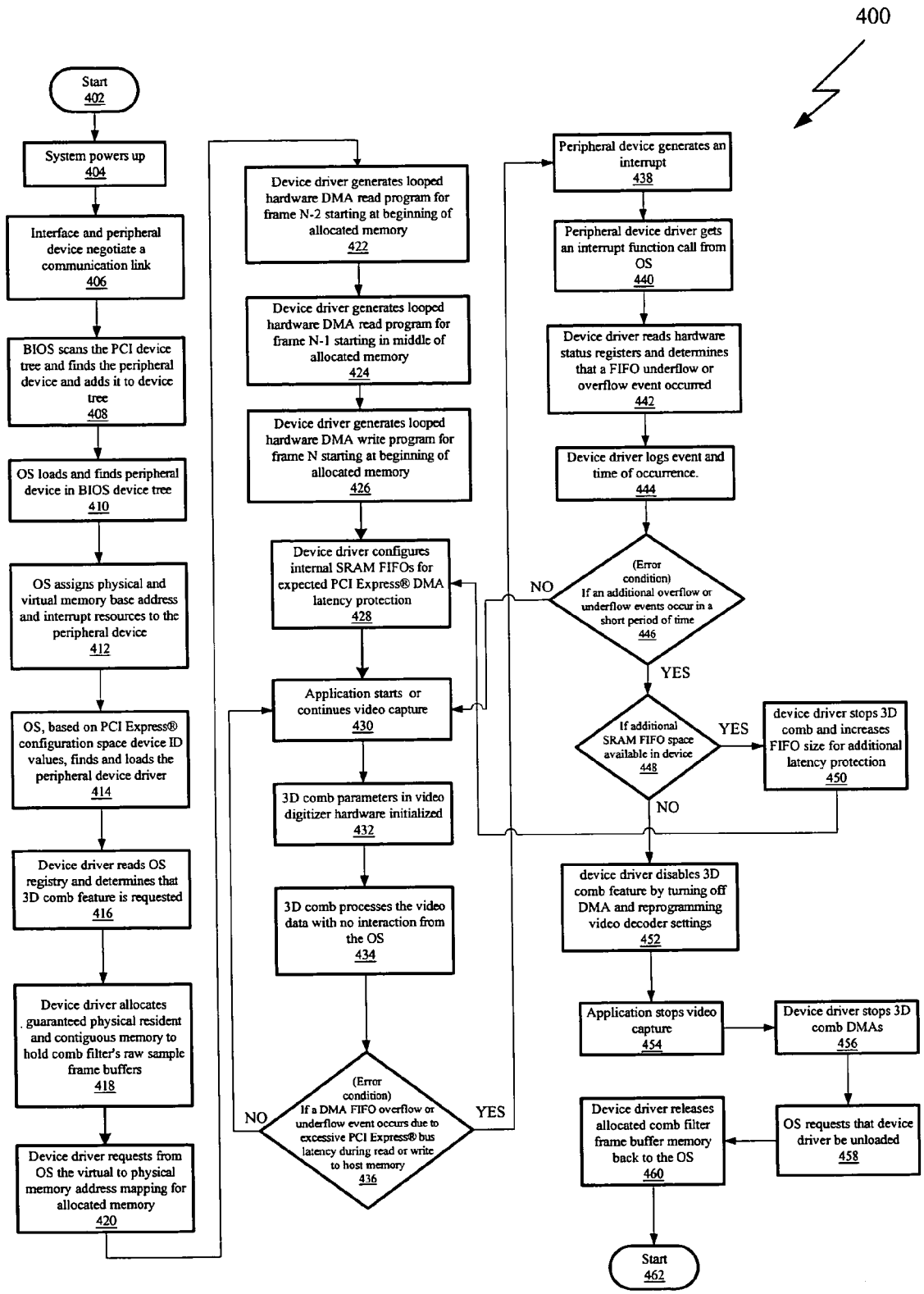
FIG. 4 is a flowchart diagram of an example of operation of the CFSHM.

In FIG. 4, a flowchart diagram 400 of an example of operation of the CFSHM is shown. The process begins in step 402 and the system powers up 404. The interface and peripheral device negotiate a communication link in step 406. As an example, if the interface utilizes a PCI Express® chipset, the PCI Express® chipset and peripheral device may negotiate a 2.5 gigabit x1 PCI Express® Link. In the example of the interface utilizing a PCI Express® chipset, the host device BIOS may scan the PCI® device tree to find the peripheral device and then adds the peripheral device to device tree in step 408. The OS loads and finds peripheral device in BIOS device tree in step 410. The OS then assigns a physical and virtual memory base address and interrupt resources to the peripheral device in step 412. The OS, based on the PCI Express® configuration space device ID values, finds and loads the peripheral device driver in step 414. The device driver reads the OS registry and determines that 3D comb feature is requested in step 416. The device driver then allocates guaranteed physical resident and contiguous memory to hold the comb filter's raw sample frame buffers (such as, for example, two full frames plus two lines) in step 418. The device driver then requests from OS the virtual to physical memory address mapping for allocated memory in step 420. The device driver then generates looped hardware DMA read program for frame N-2 starting at beginning of allocated memory in step 422 and the device driver generates looped hardware DMA read program for frame N-1 starting in middle of allocated memory in step 424. The device driver then generates looped hardware DMA write program for frame N starting at beginning of allocated memory in step 426. The device driver then configures internal SRAM FIFOs (not shown) for expected PCI Express® DMA latency protection in step 428. The application then starts the process of video capture in step 430 and the 3D comb parameters in the video digitizer hardware (such as video decoder 302) is initialized in step 432. In step 434, with the 3D comb DMA engines started, the 3D comb processes the video data with no interaction from the OS.

In decision step 436, an error condition is tested. If a DMA FIFO overflow or underflow event occurs due to excessive PCI Express® bus latency during reading or writing to host memory, the process continues to step 438. If no overflow or underflow event occurs, the process returns to step 430 and the application continued to video capture and process loops through steps 430 to 436.

In step 438, the peripheral device generates an interrupt in response to the error condition in decision step 436. As a result, the peripheral device driver receives an interrupt function call from OS in step 440 and the device driver reads the hardware status registers and determines that a FIFO underflow or overflow event occurred in step 442. The device driver logs event and time of occurrence in step 444 and the process continues to decision step 446.

In decision step 446, a second error condition is tested. If an additional overflow or underflow events occur in a short period of time, the process continues to decision step 448. If no overflow or under flow events occur, the process returns to step 430 and the application continued to video capture and process loops through steps 430 to 436.

In decision step 448, if additional SRAM FIFO space available in device, the device driver stops the 3D comb filter and increases the FIFO size for additional latency protection in step 450. The process then returns to step 428 and the process loops through steps 428 to 436. If the no additional SRAM FIFO space is available in device, the device driver disables the 3D comb filter feature by turning off the DMA and reprogramming the video decoder settings in step 452. The application then stops video capture in step 454 and the device driver stops the 3D comb filter DMAs in step 456. The OS requests that device driver be unloaded in step 458. In response, the device driver releases allocated comb filter frame buffer memory back to the OS in step 460 and the process ends 462. It is appreciated that while this example of a process has been described utilizing a PCI Express® chipset, any high bandwidth interface may be utilized in a similar way without departing from the sprit of the invention.

Persons skilled in the art will understand and appreciate that one or more processes, sub-processes, or process steps described in FIG. 4 may be performed by hardware and/or software. Additionally, the CFSHM may be implemented completely in software that would be executed within a microprocessor, general purpose processor, combination of processors, digital signal processor ("DSP"), and/or application specific integrated circuit ("ASIC"). If the process is performed by software, the software may reside in software memory in the controller. The software in software memory may include an ordered listing of executable instructions for implementing logical functions (i.e., "logic" that may be implemented either in digital form such as digital circuitry or source code or in analog form such as analog circuitry or an analog source such as an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While various preferred and alternative embodiments of the present intention are described herein, it will be apparent to one of ordinary skill in the art after reading this description that there are various modifications and extensions of the above described technology that may be implemented using these teachings without departing from the spirit and scope of the present invention, the breadth and scope of which shall be defined by following claims.

What is claimed is:

1. A comb filter system that utilizes host memory ("CFSHM"), the CFSHM comprising:
    a comb filter located on a peripheral device;
    allocated host memory located within the host memory;
    an interface in signal communication with the comb filter and allocated host memory, wherein the interface is configured to allow the comb filter utilization of the allocated host memory;
    a peripheral controller in signal communication with the interface wherein the peripheral controller is configured to control the flow of data to and from the allocated host memory; and
    a host controller located in a host device, wherein the host controller is in signal communication with the interface and is located in the host device, and wherein the host controller allocates the allocated host memory within the host memory.

2. The CFSHM of claim 1, wherein the interface includes a Peripheral Component Interface ("PCI") type of interface that is compliant with PCI Express® interface architecture.

3. The CFSHM of claim 2, wherein the comb filter is a three-dimensional comb filter ("3D comb filter).

4. The CFSHM of claim 1, wherein the comb filter is a three-dimensional comb filter ("3D comb filter).

5. The CFSHM of claim 1, wherein the peripheral controller includes peripheral controller software.

6. The CFSHM of claim 5, wherein the comb filter is a three-dimensional comb filter ("3D comb filter).

7. The CFSHM of claim 6, wherein the interface includes a Peripheral Component Interface ("PCI") type of interface that is compliant with PCI Express® interface architecture.

8. The CFSHM of claim 7, wherein the peripheral controller software includes logic configured for Direct Memory Access ("DMA") of the allocated host memory.

9. The CFSHM of claim 1, wherein the host controller includes host controller software configured to communicate with host device.

10. The CFSHM of claim 9, wherein the host controller software is operating system software for the host device.

11. The CFSHM of claim 10, wherein the host device is part of personal computer ("PC"), the host memory is system memory, and the host controller is a central processing unit ("CPU").

12. The CFSHM of claim 11, wherein the interface includes a Peripheral Component Interface ("PCI") type of interface that is compliant with PCI Express® interface architecture.

13. The CFSHM of claim 12, wherein the system memory is dynamic random access memory ("DRAM"), the CPU is an Intel® based processor, and the operating system software is a Microsoft® based operating system.

14. The CFSHM of claim 13, wherein the Microsoft® based operating system is a Windows XP® legacy based operating system.

15. The CFSHM of claim 13, wherein the Microsoft® based operating system is a Windows Longhorn legacy based operating system.

16. The CFSHM of claim 13, wherein the Microsoft® based operating system is a Windows Media Center legacy based operating system.

17. A comb filter system comprising:
a comb filter located on a peripheral device;
allocated host memory located within a host memory,
an interface in signal communication with the comb filter and allocated host memory, wherein the interface is configured to allow the comb filter utilization of the allocated host memory;
a peripheral controller in signal communication with the interface wherein the peripheral controller is configured to control the flow of data to and from the allocated host memory;
a host controller located in a host device, wherein the host controller is in signal communication with the interface and is located in the host device, and wherein the host controller allocates the allocated host memory within the host memory;
wherein the interface includes a Peripheral Component Interface ("PCI") type of interface that is compliant with PCI Express® interface architecture, wherein the comb filter is a three-dimensional comb filter ("3D comb filter) and wherein the peripheral controller includes peripheral controller software.

18. The CFSHM of claim 17, wherein the peripheral controller software includes logic configured for Direct Memory Access ("DMA") of the allocated host memory.

19. The CFSHM of claim 17, wherein the host controller includes host controller software configured to communicate with host device.

20. The CFSHM of claim 19, wherein the host controller software is operating system software for the host device.

21. The CFSHM of claim 17, wherein the host device is part of personal computer ("PC"), the host memory is system memory, and the host controller is a central processing unit ("CPU").

22. The CFSHM of claim 21, wherein the system memory is dynamic random access memory ("DRAM"), the CPU is an Intel® based processor, and the operating system software is a Microsoft® based operating system.

23. The CFSHM of claim 22, wherein the Microsoft® based operating system is a Windows XP® legacy based operating system.

24. The CFSHM of claim 23, wherein the Microsoft® based operating system is a Windows Longhorn legacy based operating system.

25. The CFSHM of claim 23, wherein the Microsoft® based operating system is a Windows Media Center legacy based operating system.

* * * * *